US009781996B1

(12) United States Patent
Thompson

(10) Patent No.: US 9,781,996 B1
(45) Date of Patent: Oct. 10, 2017

(54) COMPUTERIZED DESK WITH A TOUCH SCREEN

(71) Applicant: Amanda Thompson, Garland, TX (US)

(72) Inventor: Amanda Thompson, Garland, TX (US)

(*) Notice: Subject to any disclaimer, the term of this patent is extended or adjusted under 35 U.S.C. 154(b) by 193 days.

(21) Appl. No.: 14/866,358

(22) Filed: Sep. 25, 2015

(51) Int. Cl.
*G06F 3/041* (2006.01)
*A47B 21/04* (2006.01)
*A47B 21/06* (2006.01)
*A47B 13/08* (2006.01)

(52) U.S. Cl.
CPC ............ *A47B 21/04* (2013.01); *A47B 13/081* (2013.01); *A47B 21/06* (2013.01); *G06F 3/0412* (2013.01); *A47B 2021/066* (2013.01)

(58) Field of Classification Search
CPC ..... G06F 3/0412; A47B 21/04; A47B 13/081; A47B 21/06
See application file for complete search history.

(56) References Cited

U.S. PATENT DOCUMENTS

| | | | |
|---|---|---|---|
| D372,601 S | 8/1996 | Roberts et al. | |
| 5,715,761 A * | 2/1998 | Frattini | A47B 7/02 108/50.02 |
| 6,183,280 B1 * | 2/2001 | Laukhuf | A47B 21/06 439/214 |
| 6,219,553 B1 * | 4/2001 | Panasik | G09B 5/14 455/446 |
| 8,749,959 B2 * | 6/2014 | Riley | A47B 21/0073 312/235.2 |
| 9,152,174 B2 * | 10/2015 | Xiao | G06F 1/1601 |
| 2002/0077608 A1 * | 6/2002 | Stringer | A61M 1/28 604/317 |
| 2010/0126393 A1 * | 5/2010 | Moller | A47B 9/20 108/147 |
| 2011/0284704 A1 * | 11/2011 | Pryor | A47B 9/14 248/188.5 |
| 2013/0248242 A1 * | 9/2013 | Beldock | H01R 25/006 174/493 |
| 2014/0096706 A1 * | 4/2014 | Labrosse | A47B 21/02 108/21 |
| 2015/0083027 A1 * | 3/2015 | Martin | A47B 9/18 108/1 |
| 2016/0150877 A1 * | 6/2016 | Wei Siao | A47B 9/20 248/188.5 |
| 2016/0296006 A1 * | 10/2016 | Bonuccelli | A47B 9/20 |
| 2017/0071332 A1 * | 3/2017 | Herring | A47B 21/02 |
| 2017/0135466 A1 * | 5/2017 | Randlov | A47B 9/20 |

* cited by examiner

*Primary Examiner* — Hoa C Nguyen
*Assistant Examiner* — Keith Depew
(74) *Attorney, Agent, or Firm* — Stevenson IP, LLC

(57) ABSTRACT

A computerized desk with a touch screen including a base unit, a pair of telescopic front legs attached to a bottom surface of the base unit, a pair of hollow back legs attached to the bottom surface of the base unit, and a pair of apertures disposed through a front surface of one of the pairs of back legs. A touch screen is disposed within a top surface of the base unit, a first central processing unit is attached to the bottom surface of the base unit, at least one USB port is disposed on the base unit, and an audio port is disposed on the base unit. A second central processing unit disposed proximal to the first central processing unit is in wireless communication with the first central processing unit.

5 Claims, 5 Drawing Sheets

COMPUTERIZED DESK WITH A TOUCH SCREEN

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of computerized desks are known in the prior art. However, what has been needed is a computerized desk with a touch screen including a base unit, a pair of telescopic front legs attached to a bottom surface of the base unit, a pair of hollow back legs attached to the bottom surface of the base unit, and a pair of apertures disposed through a front surface of one of the pairs of back legs. What has been further needed is a touch screen disposed within a top surface of the base unit, a first central processing unit attached to the bottom surface of the base unit, at least one USB port disposed on the base unit, and an audio port disposed on the base unit. Lastly, what has been needed is a second central processing unit disposed proximal to the first central processing unit, with the second central processing unit in wireless communication with the first central processing unit. The computerized desk with a touch screen can be utilized by at least one student in a classroom to download and view e-textbooks, complete exams, and take lecture notes on the touch screen using a stylus pen. An optional privacy filter on the touchscreen helps to prevent a second student from cheating during an exam. It is envisioned that a teacher will utilize the second processing unit to interact and communicate with students during class. It is also envisioned that the second processing unit will have the capability to view a plurality of individual touch screens simultaneously and to separately interact with each of the plurality of touch screens. The use of the computerized desk with a touch screen will eliminate the need for paper, textbooks, backpacks, and writing utensils.

FIELD OF THE INVENTION

The present invention relates to computerized desks, and more particularly, to a computerized desk with a touch screen.

SUMMARY OF THE INVENTION

The general purpose of the present computerized desk with a touch screen, described subsequently in greater detail, is to provide a computerized desk which has many novel features that result in a computerized desk with a touch screen which is not anticipated, rendered obvious, suggested, or even implied by prior art, either alone or in combination thereof.

To accomplish this, the present computerized desk with a touch screen includes a substantially rectangular base unit having a top surface, a bottom surface, a front right edge, a front left edge, a back right edge, and a back left edge. A pair of telescopic front legs includes a front right leg and a front left leg. The front right leg is attached to the bottom surface of the base unit proximal the right front edge, and the front left leg is attached to the bottom surface of the base unit proximal the front left edge. Each of the pair of front legs further includes a substantially square hollow outer leg and a substantially square inner leg. The outer leg has an open top end. The inner leg has a top side and a bottom side. The top side of the inner leg is disposed on the bottom surface of the base unit, and the bottom side of the inner leg is removably disposed through the open top end of the outer leg. An inner perimeter of the outer leg substantially conforms to a perimeter of the inner leg. The inner leg is selectively attachable to the outer leg through a locking pin removably disposed through one of a plurality of a pair of holes disposed through the inner leg and a pair of identical holes disposed through the outer leg.

The computerized desk with a touch screen further includes a pair of substantially square hollow back legs including a back right leg and a back left leg. Each of the pair of back legs has a front surface, a top area, and a bottom area. The back right leg is attached to the bottom surface of the base unit proximal the back right edge, and the back left leg is attached to the bottom surface of the base unit proximal the back left edge. A pair of apertures includes a top aperture and a bottom aperture. The top aperture is disposed through the front surface of the back left leg proximal the top area, and the bottom aperture is disposed through the front surface of the back left leg proximal the bottom area.

A touch screen is disposed within the top surface of the base unit. The touch screen is optionally rectangular and has a privacy filter. A perimeter of the touch screen substantially conforms to a perimeter of the base unit. A first central processing unit is attached to the bottom surface of the base unit. A power cord is in operational communication with a power source connector disposed on the first central processing unit. A right end of the power cord is attachable to the power source connector, and a left end of the power cord is removably attachable to a power source. The power cord is continuously disposed through the top aperture, the hollow back left leg, and the bottom aperture. At least one USB port is disposed on the base unit. An audio port is also disposed on the base unit. The at least one USB port and the audio port are optionally disposed on the top surface of the base unit proximal the front right edge. The power source, the first central processing unit, the at least one USB port, the audio port, and the touch screen are in operational communication with each other. A second central processing unit is disposed proximal to the first central processing unit. The first central processing unit is in wireless communication with the second central processing unit.

Thus has been broadly outlined the more important features of the present computerized desk with a touch screen so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
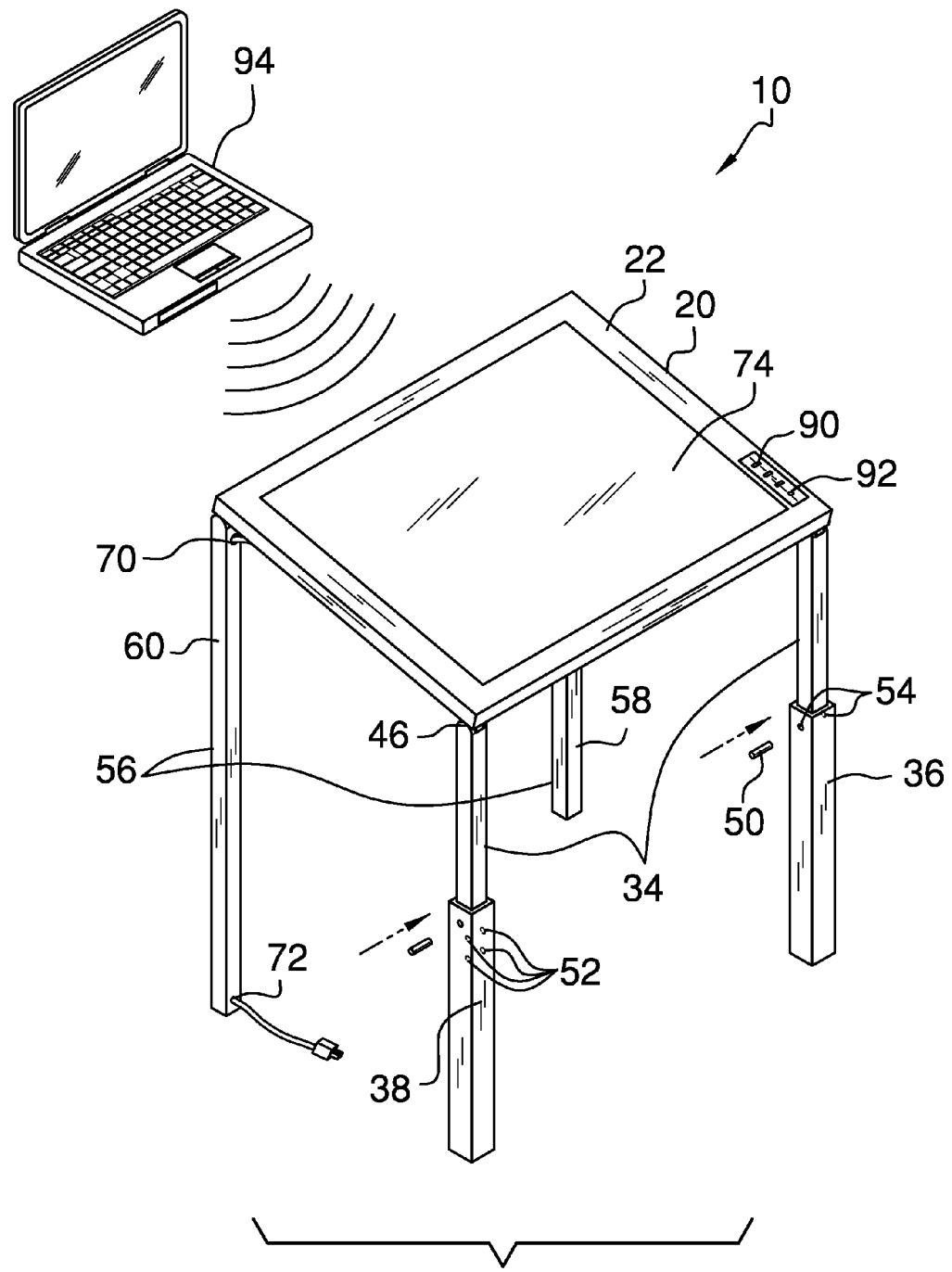
FIG. 1 is a front isometric view.
Figure 2:
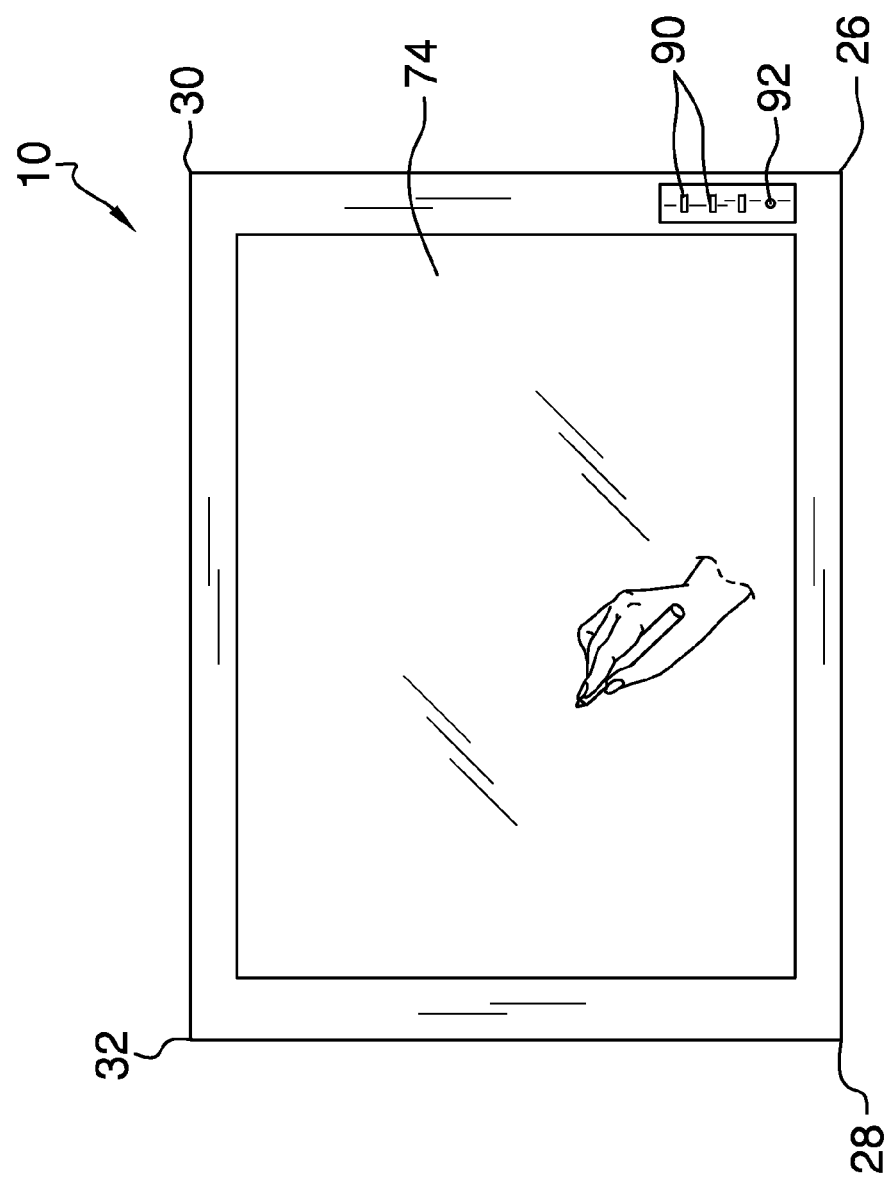
FIG. 2 is a top plan view.
Figure 3:
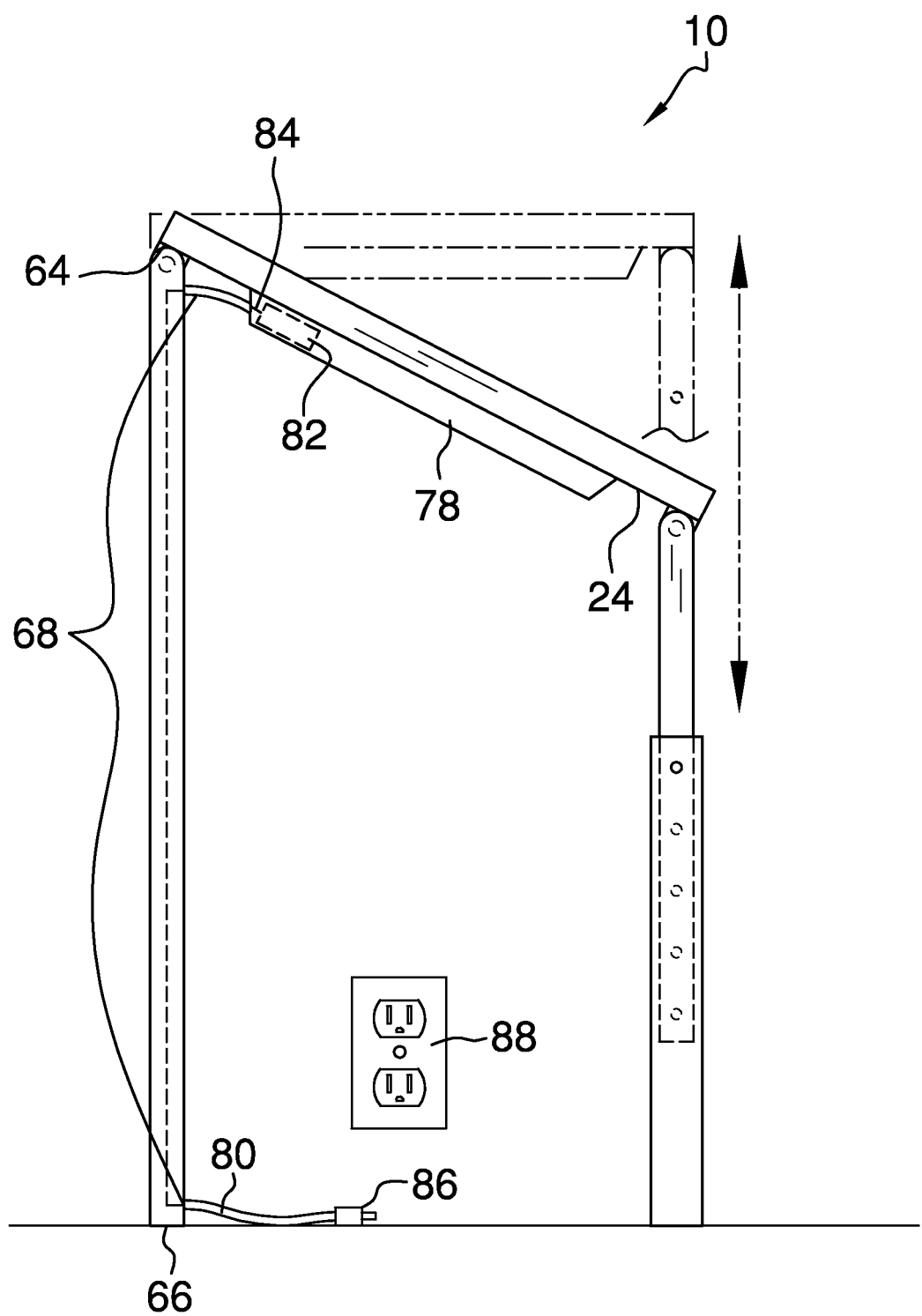
FIG. 3 is a side elevation view.
Figure 4:
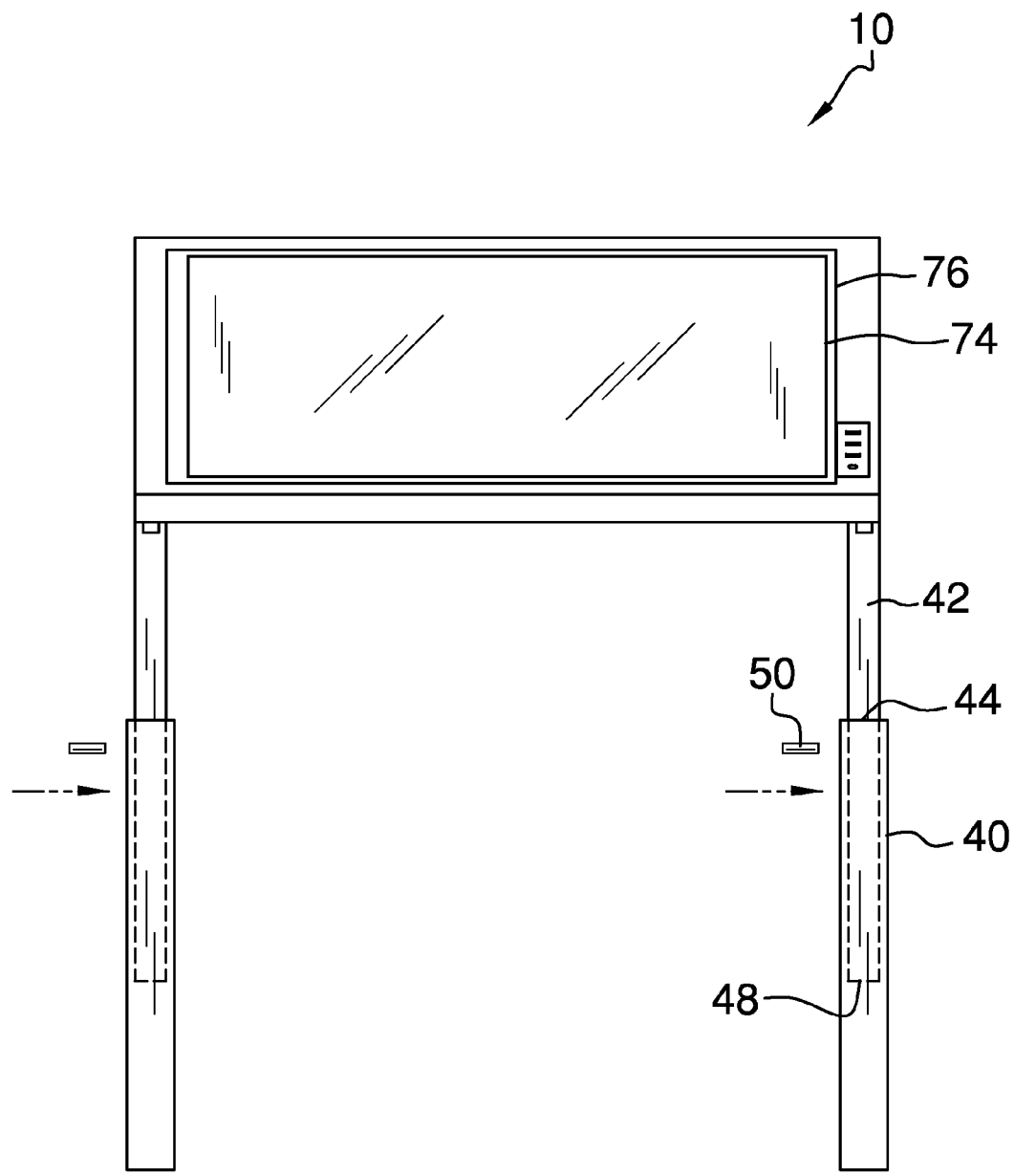
FIG. 4 is a front elevation view.

With reference now to the drawings, and in particular FIGS. 1 through 5 thereof, an example of the instant computerized desk with a touch screen employing the principles and concepts of the present computerized desk with a touch screen and generally designated by the reference number 10 will be described.

Referring to FIGS. 1 through 5 the present computerized desk with a touch screen 10 is illustrated. The computerized desk with a touch screen 10 includes a substantially rectangular base unit 20 having a top surface 22, a bottom surface 24, a front right edge 26, a front left edge 28, a back right edge 30, and a back left edge 32. A pair of telescopic front legs 34 includes a front right leg 36 and a front left leg 38. The front right leg 36 is attached to the bottom surface 24 of the base unit 20 proximal the right front edge 26, and the front left leg 38 is attached to the bottom surface 24 of the base unit 20 proximal the front left edge 28. Each of the pair of front legs 34 further includes a substantially square hollow outer leg 40 and a substantially square inner leg 42. The outer leg 40 has an open top end 44. The inner leg 42 has a top side 46 and a bottom side 48. The top side 46 of the inner leg 42 is disposed on the bottom surface 24 of the base unit 20, and the bottom side 48 of the inner leg 42 is removably disposed through the open top end 44 of the outer leg 40. The inner leg 42 is selectively attachable to the outer leg 40 through a locking pin 50 removably disposed through one of a plurality of a pair of holes 52 disposed through the inner leg 42 and a pair of identical holes 54 disposed through the outer leg 40.

The computerized desk with a touch screen 10 further includes a pair of substantially square hollow back legs 56 including a back right leg 58 and a back left leg 60. Each of the pair of back legs 56 has a front surface 62, a top area 64, and a bottom area 66. The back right leg 58 is attached to the bottom surface 24 of the base unit 20 proximal the back right edge 30, and the back left leg 60 is attached to the bottom surface 24 of the base unit 20 proximal the back left edge 32. A pair of apertures 68 includes a top aperture 70 and a bottom aperture 72. The top aperture 70 is disposed through the front surface 62 of the back left leg 60 proximal the top area 64, and the bottom aperture 72 is disposed through the front surface 62 of the back left leg 60 proximal the bottom area 66.

Figure 5:
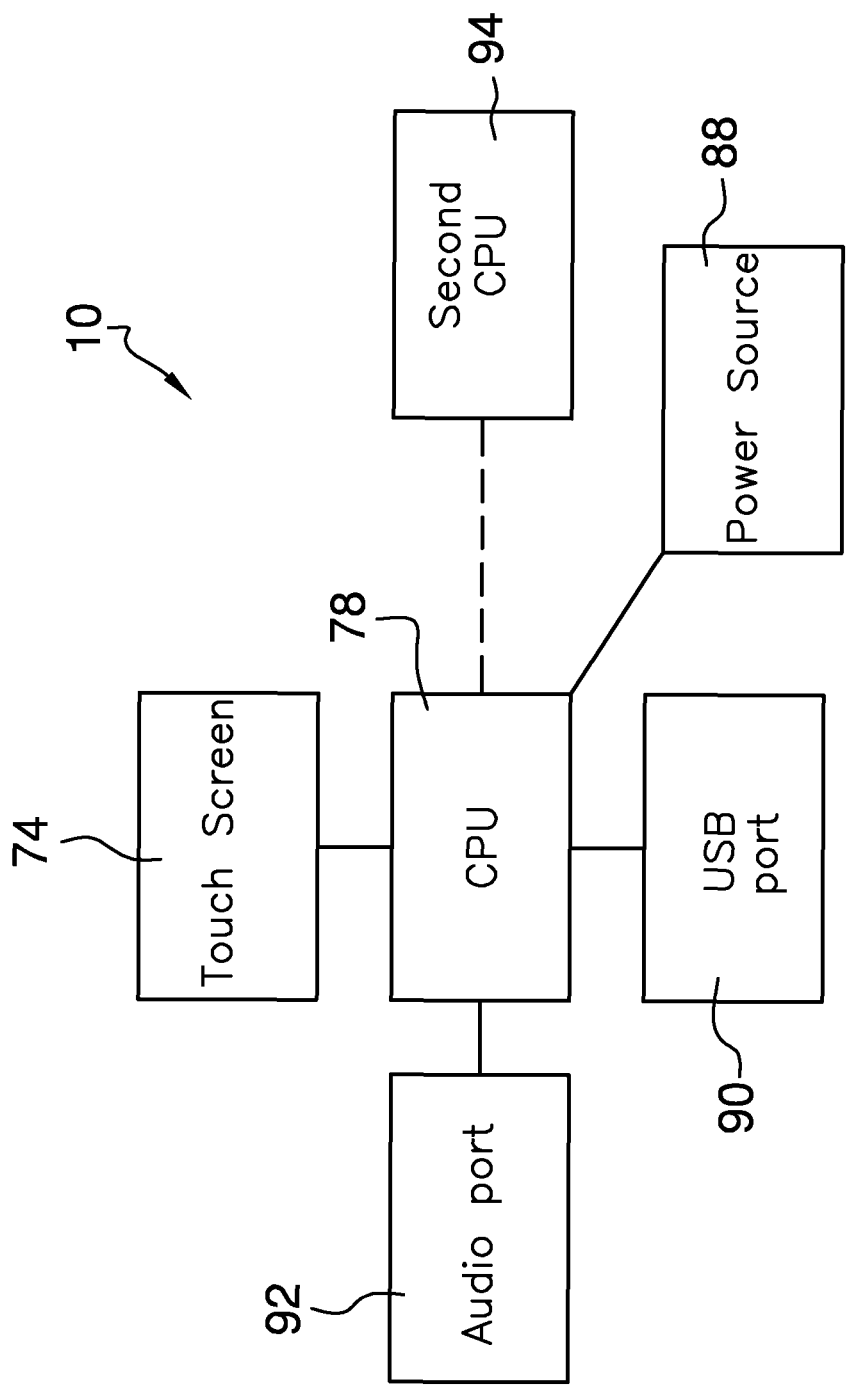
FIG. 5 is a block diagram.

A touch screen 74 is disposed within the top surface 22 of the base unit 20. The touch screen is optionally rectangular and has a privacy filter 76. A first central processing unit 78 is attached to the bottom surface 24 of the base unit 20. A power cord 80 is in operational communication with a power source connector 82 disposed on the first central processing unit 78. A right end 84 of the power cord 80 is attachable to the power source connector 82, and a left end 86 of the power cord 80 is removably attachable to a power source 88. The power cord 80 is continuously disposed through the top aperture 70, the hollow back left leg 60, and the bottom aperture 72. At least one USB port 90 is disposed on the base unit 20. An audio port 92 is also disposed on the base unit 20. The at least one USB port 90 and the audio port 92 are optionally disposed on the top surface 22 of the base unit 20 proximal the front right edge 26. As best shown in FIG. 5, the power source 88, the first central processing unit 78, the at least one USB port 90, the audio port 92, and the touch screen 74 are in operational communication with each other. A second central processing unit 94 is disposed proximal to the first central processing unit 78. The first central processing unit 78 is in wireless communication with the second central processing unit 94.

What is claimed is:
1. A computerized desk with a touch screen comprising:
a substantially rectangular base unit having a top surface, a bottom surface, a front right edge, a front left edge, a back right edge, and a back left edge;
a pair of telescopic front legs comprising a front right leg and a front left leg, wherein the front right leg is attached to the base unit bottom surface proximal the front right edge, and the front left leg is attached to the base unit bottom surface proximal the front left edge, each of the pair of front legs further comprising:
a substantially square hollow outer leg having an open top end;
a substantially square inner leg having a top side and a bottom side, wherein the top side of the inner leg is disposed on the base unit bottom surface, and the bottom side is removably disposed through the open top end of the outer leg;
wherein an inner perimeter of the outer leg substantially conforms to a perimeter of the inner leg;
wherein the inner leg is selectively attachable to the outer leg through a locking pin removably disposed through one of a plurality of a pair of holes disposed through the inner leg and a pair of identical holes disposed through the outer leg;
a pair of substantially square hollow back legs comprising a back right leg and a back left leg, each of the pair of back legs having a front surface, a top area, and a bottom area, wherein the back right leg is attached to the base unit bottom surface proximal the back right edge, and the back left leg is attached to the base unit bottom surface proximal the back left edge;
a pair of apertures comprising a top aperture and a bottom aperture, wherein the top aperture is disposed through the back left leg front surface proximal the top area, and the bottom aperture is disposed through the back left leg front surface proximal the bottom area;
a touch screen disposed within the base unit top surface;
where a perimeter of the touch screen substantially conforms to a perimeter of the base unit;
a first central processing unit attached to the base unit bottom surface;
a power cord in operational communication with a power source connector disposed on the first central processing unit, wherein a right end of the power cord is attachable to the power source connector, and a left end of the power cord is removably attachable to a power source, wherein the power cord is continuously disposed through the top aperture, the hollow back left leg, and the bottom aperture;
at least one USB port disposed on the base unit;
an audio port disposed on the base unit;
wherein the power source, the first central processing unit, the at least one USB port, the audio port, and the touch screen are in operational communication with each other; and
a second central processing unit disposed proximal to the first central processing unit;
wherein the first central processing unit is in wireless communication with the second central processing unit.
2. The computerized desk with a touch screen of claim 1 wherein the touch screen is rectangular.

3. The computerized desk with a touch screen of claim 2 wherein the at least one USB port is disposed on the base unit top surface proximal the front right edge.

4. The computerized desk with a touch screen of claim 3 wherein the audio port is disposed on the base unit top surface proximal the front right edge.

5. The computerized desk with a touch screen of claim 4 wherein the touch screen has a privacy filter.

* * * * *